United States Patent
Gu

(10) Patent No.: US 10,209,599 B2
(45) Date of Patent: Feb. 19, 2019

(54) DISPLAY PANEL, DISPLAY METHOD THEREOF AND DISPLAY DEVICE

(71) Applicant: BOE TECHNOLOGY GROUP CO., LTD., Beijing (CN)

(72) Inventor: Xin Gu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 25 days.

(21) Appl. No.: 15/329,178

(22) PCT Filed: May 6, 2016

(86) PCT No.: PCT/CN2016/081219
§ 371 (c)(1),
(2) Date: Jan. 25, 2017

(87) PCT Pub. No.: WO2017/133101
PCT Pub. Date: Aug. 10, 2017

(65) Prior Publication Data
US 2018/0067369 A1    Mar. 8, 2018

(30) Foreign Application Priority Data
Feb. 3, 2016    (CN) .......................... 2016 1 0076591

(51) Int. Cl.
*G02F 1/155*    (2006.01)
*G02F 1/157*    (2006.01)
(Continued)

(52) U.S. Cl.
CPC .............. *G02F 1/155* (2013.01); *G02F 1/153* (2013.01); *G02F 1/157* (2013.01); *G02F 1/167* (2013.01);
(Continued)

(58) Field of Classification Search
CPC .......... G02F 1/15; G02F 1/1521; G02F 1/153; G02F 1/155; G02F 1/157; G02F 1/163;
(Continued)

(56) References Cited

U.S. PATENT DOCUMENTS 6,950,220 B2 * 9/2005 Abramson ................ G02F 1/15
359/265
7,333,259 B2 * 2/2008 Hirano ...................... G02F 1/15
359/265
(Continued)

FOREIGN PATENT DOCUMENTS

CN    101201523 A    6/2008
CN    102301274 A    12/2011
(Continued)

OTHER PUBLICATIONS

International Search Report and Written Opinion dated Sep. 29, 2016; PCT/CN2016/081219.
(Continued)

*Primary Examiner* — Loha Ben
(74) *Attorney, Agent, or Firm* — Ladas & Parry LLP

(57) ABSTRACT

A display panel, a display method thereof and a display device are disclosed. The display panel includes an electrochromic layer (101) and an electrolyte layer (102) arranged in a stacked manner, and at least one kind of colored charged particles (103) being provided in the electrolyte layer (102). While the electrochromic layer (102) is transparent, the display panel displays color of the colored charged particles (103). The display panel may further display the color of the colored charged particles, which increases diversity of the colors displayed by the display panel.

18 Claims, 2 Drawing Sheets

(51) Int. Cl.
*H01M 4/04* (2006.01)
*G09G 3/38* (2006.01)
*G09G 3/34* (2006.01)
*G02F 1/153* (2006.01)
*G02F 1/167* (2006.01)
*G02F 1/15* (2006.01)

(52) U.S. Cl.
CPC ............... *G09G 3/34* (2013.01); *G09G 3/38* (2013.01); *H01M 4/0442* (2013.01); *G02F 2001/1512* (2013.01); *G02F 2001/1672* (2013.01); *G02F 2201/123* (2013.01); *G02F 2201/44* (2013.01); *G02F 2201/50* (2013.01); *G02F 2203/34* (2013.01)

(58) Field of Classification Search
CPC ......... G02F 2001/1512; G02F 2201/50; G02F 2201/123; G02F 2203/34; G02F 1/167; G02F 2001/1515; G02F 2001/1672; G02F 2201/44; G09G 3/002; G09G 3/003; G09G 3/2003; G09G 3/2096; G09G 3/32; G09G 3/3208; G09G 3/34; G09G 3/344; G09G 3/3446; G09G 3/3453; G09G 3/36; G09G 3/38; H01M 4/0442; H04N 9/69; H04N 9/73; H04N 9/77; H04N 9/643; H04N 13/0497

USPC ........ 359/265, 267, 270, 273–275; 345/4, 5, 345/105, 107
See application file for complete search history.

(56) References Cited

U.S. PATENT DOCUMENTS

| | | | | |
|---|---|---|---|---|
| 7,397,595 B2* | 7/2008 | Kojima | ............... | G02F 1/155 359/270 |
| 8,102,586 B2* | 1/2012 | Albahri | ............... | B60J 3/04 359/265 |
| 9,323,125 B2* | 4/2016 | Chen | ............... | G02F 1/163 |

FOREIGN PATENT DOCUMENTS

| | | |
|---|---|---|
| CN | 102346343 A | 2/2012 |
| CN | 103309115 A | 9/2013 |
| CN | 104216191 A | 12/2014 |
| CN | 105511197 A | 4/2016 |
| KR | 20070024752 A | 3/2007 |

OTHER PUBLICATIONS

The First Chinese Office Action dated Oct. 11, 2017; Appln. 201610076591.X.

\* cited by examiner

DISPLAY PANEL, DISPLAY METHOD THEREOF AND DISPLAY DEVICE

TECHNICAL FIELD

Embodiments of the present disclosure relate to a display panel, a display method thereof and a display device.

BACKGROUND

An electrochromic phenomenon refers to a fact that under an effect of an external electric field, an electrochromic material undergoes oxidation or reduction, which leads to its reversible change between light transmission and light reflection, and is embodied as a reversible allochroic phenomenon in its appearance. At present, the electrochromic material is widely used in many fields, such as a smart window (which is used for adjusting light intensity and reducing heat radiation), and anti-glare vehicle rearview mirror. In an aspect of display, the electrochromic material is mainly used in electronic books or low-end products, such as smart label, etc., which has characteristics such as no backlight and energy conservation. However, white or black displayed by a current electrochromic display panel is not very good.

SUMMARY

An Embodiment of the present disclosure provides a display panel, which comprises: an electrochromic layer and an electrolyte layer arranged in a stacked manner, and at least one kind of colored charged particles being provided in the electrolyte layer; wherein, in condition that the electrochromic layer is transparent, the display panel displays color of the colored charged particles.

As an example, the display panel further comprises a plurality of pixel units arranged in a matrix, wherein a pixel barrier wall is provided in a gap between pixel units in adjacent columns and adjacent rows; and the electrochromic layer and the electrolyte layer are located in a chamber enclosed by the pixel barrier wall.

As an example, the material of the electrochromic layer is an anode allochroic material, and the colored charged particles are positively charged; or, the material of the electrochromic layer is a cathode allochroic material, and the colored charged particles are negatively charged.

As an example, the colored charged particles comprise only one kind of charged particles.

As an example, the color of the colored charged particles is white or black.

As an example, the colored charged particles comprise only first charged particles and second charged particles; an electric quantity of the first charged particles is same as an electric quantity of the second charged particles; and a mobility of the first charged particles is larger than a mobility of the second charged particles.

As an example, the color of the first charged particles is white, and color of the second charged particles is black; or, the color of the first charged particles is black, and the color of the second charged particles is white.

As an example, the electrochromic layer is closer to a display side of the display panel with respect to the electrolyte layer.

An embodiment of the present disclosure provides a display device which comprises the aforementioned display panel.

An embodiment of the present disclosure provides a display method of the aforementioned display panel, the method comprises: applying a voltage difference to the electrochromic layer in the display panel; the colored charged particles in the display panel migrating to a side close to the electrochromic layer under an effect of an electric field force, while the applied voltage difference makes the electrochromic layer become transparent, so that the display panel displays color of the colored charged particles.

As an example, a material of the electrochromic layer is an anode allochroic material, and the colored charged particles are positively charged; or, a material of the electrochromic layer is a cathode allochroic material, and the colored charged particles are negatively charged.

As an example, the colored charged particles comprise only one kind of charged particles; and the step of the colored charged particles in the display panel migrating to a side close to the electrochromic layer under an effect of an electric field force comprises: the charged particles migrating to the side close to the electrochromic layer under the effect of the electric field force, when the voltage difference is negative, if the material of the electrochromic layer is an anode allochroic material; and the charged particles migrating to the side close to the electrochromic layer under the effect of the electric field force, when the voltage difference is positive, if the material of the electrochromic layer is a cathode allochroic material.

As an example, the colored charged particles comprises only the first charged particles and the second charged particle, and the material of the electrochromic layer is an anode allochroic material, the first charged particles and the second charged particles are both positively charged; an electric quantity of the first charged particles is same as an electric quantity of the second charged particles, and a mobility of the first charged particles is larger than a mobility of the second charged particles; the step of the colored charged particles in the display panel migrating to a side close to the electrochromic layer under an effect of an electric field force comprises: the first charged particles migrating to the side closer to the electrochromic layer than the second charged particles under the effect of the electric field force, when an absolute value of the voltage difference is between an absolute value of a first preset voltage value and an absolute value of a second preset voltage value; and, the second charged particles migrating to the side closer to the electrochromic layer than the first charged particles under the effect of the electric field force, when an absolute value of the voltage difference is equal to or greater than the absolute value of the second preset voltage value; and the absolute value of the first preset voltage value is a minimum voltage absolute value that enables the anode allochroic material to become transparent and to drive the first charged particles to migrate; the absolute value of the second preset voltage value is a minimum voltage absolute value that enables the anode allochroic material to become transparent and to drive the second charged particles to migrate; the first preset voltage value and the second preset voltage value are negative; and the first preset voltage value is larger than the second preset voltage value.

As an example, the colored charged particles comprise only the first charged particles and the second charged particle, and the material of the electrochromic layer is a cathode allochroic material, the first charged particles and the second charged particles are both negatively charged; an electric quantity of the first charged particles is the same as an electric quantity of the second charged particles, and an mobility of the first charged particles is larger than an mobility of the second charged particles; the step of the colored charged particles in the display panel migrating to a side close to the electrochromic layer under an effect of an electric field force comprises: the first charged particles migrating to the side closer to the electrochromic layer than the second charged particles under the effect of the electric field force, when the voltage difference is between a third preset voltage value and a fourth preset voltage value; and the second charged particles migrating to the side closer to the electrochromic layer than the first charged particles under the effect of the electric field force, when the voltage difference is equal to or greater than the fourth preset voltage value; the third preset voltage value is a minimum voltage value that enables the cathode allochroic material to become transparent and to drive the first charged particles to migrate; the fourth preset voltage value is a minimum voltage value that enables the cathode allochroic material to become transparent and to drive the second charged particles to migrate; the third preset voltage value and the fourth preset voltage value are positive; and the third preset voltage value is smaller than the fourth preset voltage value.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

DETAILED DESCRIPTION

In order to make objects, technical details and advantages of the embodiments of the present disclosure apparent, the technical solutions of the embodiment will be described in a clearly and fully understandable way in connection with the drawings related to the embodiments of the present disclosure. It is obvious that the described embodiments are just a part but not all of the embodiments of the present disclosure. Based on the described embodiments herein, those skilled in the art can obtain other embodiment(s), without any inventive work, which should be within the scope of the present disclosure.

Figure 1:
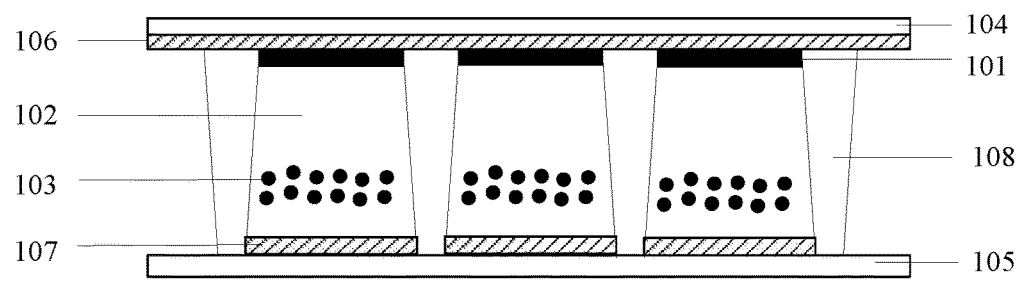
FIG. 1 is a cross-sectional schematic diagram of a display panel provided by an embodiment of the present disclosure.

An embodiment of the present disclosure provides a display panel. FIG. 1 is a cross-sectional schematic diagram of a display panel provided by an embodiment of the present disclosure. As illustrated in FIG. 1, the display panel comprises: an electrochromic layer 101 and an electrolyte layer 102 arranged in a stacked manner, and at least one colored charged particles 103 being arranged in the electrolyte layer 102. When the electrochromic layer 101 is transparent, the display panel displays the color of colored charged particles 103.

In FIG. 1, only several film layers are illustrated. When actually used, other film layers may be provided according to practical requirements. The display panel provided by the embodiment of the present disclosure is, for example, an electrochromic display device, which may be applied to an electronic book or applied to other products having a display function according to practical requirements.

White or black displayed by a current electrochromic display device is not very good. In the display panel provided in the embodiment of the present disclosure, the display panel comprises the electrochromic layer 101 and the electrolyte layer 102, and the colored charged particles 103 being provided in the electrolyte layer 102. Under an effect of an external electric field, the electrochromic material undergoes oxidation or reduction reaction; and the embodiment of the present disclosure utilizes the characteristics of the electrochromic material which is capable of reversibly variation. When the electrochromic layer 101 becomes transparent (light-transmitted), the display panel displays the color of the colored charged particles 103, such as pure white or pure black. Since the display panel is capable of displaying the color of colored charged particles 103, the diversity of colors displayed by the display panel is increased.

For example, with respect to the electrolyte layer 102, the electrochromic layer 101 is closer to a display side of the display panel.

The electrochromic layer 101 becomes transparent, because the electrochromic material undergoes oxidation or reduction reaction under the effect of the external electric field. By applying a voltage difference, the electrochromic layer 101 becomes transparent, and at the same time, colored charged particles 103 may migrate under an effect of an electric field force. In order to generate the voltage difference, a first conductive layer 106 is arranged between a first substrate 104 and the electrochromic layer 101, and a second conductive layer 107 is arranged between a second substrate 105 and the electrolyte layer 102. That is, the voltage difference is generated between the first conductive layer 106 and the second conductive layer 107, and by applying different voltage differences, the electrochromic material may undergo oxidation or reduction reaction.

For example, the display panel comprises a plurality of sub-pixel units. In the embodiment of the present disclosure, in order to isolate the pixels from one another, a pixel barrier wall 108 is arranged between pixel units in adjacent columns and adjacent rows. For example, the display panel comprises: a plurality of pixel units arranged in a matrix, and the pixel barrier wall 108 being provided between pixel units in adjacent columns and adjacent rows. The electrochromic layer 101 and the electrolyte layer 102 are located in a chamber enclosed by a pixel barrier wall 108.

In the embodiment of the present disclosure, the pixel barrier wall 108 is provided between pixel units in adjacent columns and adjacent rows, and at the same time, a thickness of the pixel barrier wall 108 between the first substrate 104 and the second substrate 105 is equal to or greater than a gap between the first substrate 104 and the second substrate 105, so that the pixel barrier wall 108 can isolate the pixel units from one another, and at the same time, support the first substrate 104 or the second substrate 105. The electrochromic layer 101 and the electrolyte layer 102 as described above are located in a chamber enclosed by the pixel barrier wall 108. As illustrated in FIG. 1, the diagram shows three relatively large trapezoids, i.e., a cross-sectional schematic diagram of the chamber enclosed by the pixel barrier wall 108. The thickness of the pixel barrier wall 108, that is, a width of the pixel barrier wall 108 in FIG. 1, may be set according to practical requirements. In order not to affect the pixels, the width of the pixel barrier wall 108 is, for example, about 5 µm.

For example, the electrochromic material may be classified into an inorganic electrochromic material and an organic electrochromic material according to types. In addition, according to different principles of oxidation and reduction, the electrochromic material may be classified into an anode allochroic material and a cathode allochroic material. For example, for an organic electrochromic material, the anode allochroic material comprises methyl viologen, and the cathode allochroic material comprises polythiophene and the like. For example, the inorganic electrochromic material comprises a transition metal oxide. For example, the anode allochroic material comprises iridium oxide, cadmium oxide, rhodium oxide, vanadium oxide and the like, and the cathode allochroic material comprises tungsten oxide, molybdenum oxide and the like. In the embodiment of the present disclosure, the material for forming the electrochromic layer may be selected according to practical requirements and is not limited to the above exemplified materials.

In order to more clearly illustrate an implementing principle of the embodiment of the present disclosure, electrical property of the colored charged particles 103 will be described below in detail when different types of materials are selected for the electrochromic layer 101. For example, the material of the electrochromic layer 101 is an anode allochroic material, and the colored charged particles 103 are positively charged. For example, the material of the electrochromic layer 101 is a cathode allochroic material, and the colored charged particles 103 are negatively charged.

If the electrochromic layer 101 uses an anode allochroic material, a voltage difference which enables the electrochromic layer 101 to become transparent at this time is negative (i.e., a voltage applied to the first conductive layer 106 is smaller than a voltage applied to the second conductive layer 107); in order to allow the colored charged particles 103 to migrate to a side close to the electrochromic layer 101 when the voltage difference is negative, the colored charged particles 103 at this time are positively charged. If the electrochromic layer 101 uses a cathode allochroic material, a voltage difference which enables the electrochromic layer 101 to become transparent at this time is positive (i.e., a voltage applied to the first conductive layer 106 is larger than a voltage applied to the second conductive layer 107); in order to allow the colored charged particles 103 to migrate to the side close to the electrochromic layer 101 when the voltage difference is positive, the colored charged particles 103 at this time are negatively charged.

The colored charged particles 103 contained in the electrolyte layer 102 according to the embodiment of the present disclosure may be either one kind or two kinds.

For example, the colored charged particles 103 comprise only one kind of charged particles.

For example, in a case where the colored charged particles 103 comprise only one kind of charged particles, the colored charged particles 103 may be white charged particles or black charged particles. In case that the colored charged particles 103 are the white charged particles, if the electrochromic layer 101 becomes transparent, at this time, the display panel displays white; and in case that the colored charged particles 103 are the black charged particles, if the electrochromic layer 101 becomes transparent, the display panel displays black. In addition, if other colors are to be displayed, the color of the colored charged particles 103 is the color which needs to be displayed, for example, yellow, blue, gray, or the like.

For example, the colored charged particles 103 comprise two kinds of charged particles.

Figure 2:
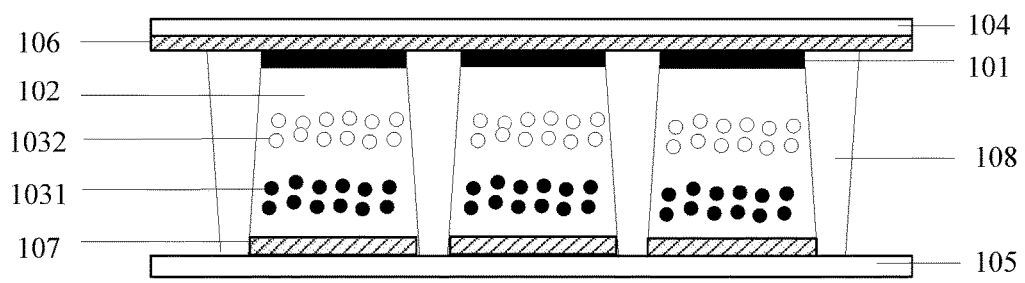
FIG. 2 is another cross-sectional schematic diagram of the display panel provided by the embodiment of the present disclosure.

FIG. 2 is another cross-sectional schematic diagram of the display panel provided by the embodiment of the present disclosure. A main difference between the display panel illustrated in FIG. 2 and the display panel illustrated in FIG. 1 is that: the electrolyte layer 102 contains two kinds of colored charged particles 103, namely, first charged particles 1031 and second charged particles 1032.

For example, the colored charged particles 103 comprise the first charged particles 1031 and the second charged particles 1032; an electric quantity of the first charged particles 1031 is same as an electric quantity of the second charged particles 1032; and a mobility of the first charged particles 1031 is greater than a mobility of the second charged particles 1032.

The colored charged particles 103 comprise the first charged particles 1031 and the second charged particles 1032, both of which have the same electric quantity, but differs from each other in mobility. Thus, when an appropriate voltage difference is applied, the charged particles having high mobility will migrate firstly; and then an absolute value of the voltage difference are increased until the charged particles having low mobility is driven to migrate; electrical properties and electric quantities of the two kinds of charged particles are the same, at this time, the charged particles having low mobility, as compared with the charged particles having high mobility, has a greater driving force for migration, and is more likely to migrate.

With respect to colors of the first charged particle 1031 and the second charged particles 1032, they may be selected according to practical requirements. For example, the color of the first charged particles 1031 is white, and the color of the second charged particles 1032 is black; or the color of the first charged particles 1031 is black, and the color of the second charged particles 1032 is white. When the electrochromic layer 101 is transparent, if the charged particles close to a side of the electrochromic layer 101 are white, the display panel displays white, and if the charged particles close to a side of the electrochromic layer 101 are black, the display panel displays black.

An embodiment of the present disclosure further provides a display device, comprising any display panel provided by the embodiment of the present disclosure.

An embodiment of the present disclosure further provides a display method of the above-described display panel.

Figure 3:
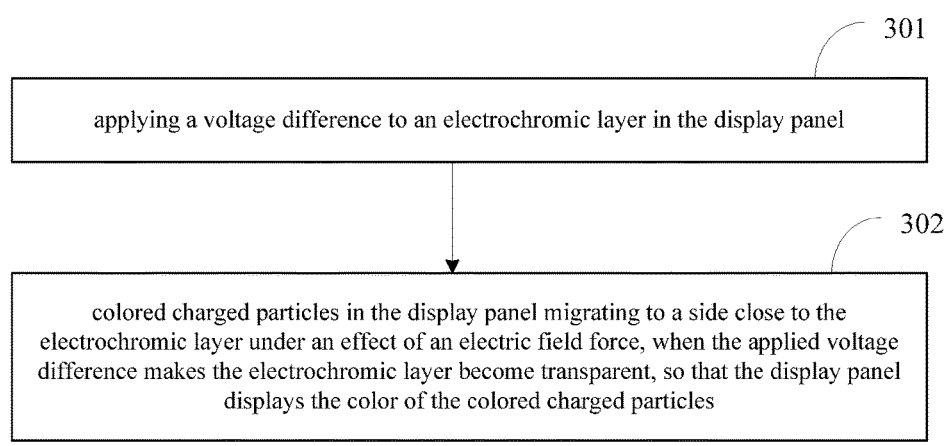
FIG. 3 is a flow schematic diagram of a display method of a display panel provided by an embodiment of the present disclosure.

FIG. 3 is a flow schematic diagram of a display method of a display panel provided by an embodiment of the present disclosure. As illustrated in FIG. 3, the method comprises:

Step 301: applying a voltage difference to an electrochromic layer in the display panel;

Step 302: colored charged particles in the display panel migrating to a side close to the electrochromic layer under an effect of an electric field force, while the applied voltage difference makes the electrochromic layer to become transparent, so that the display panel displays color of the colored charged particles.

The electrochromic material becomes transparent, because an electrochromic material undergoes oxidation or reduction reaction under the effect of an external electric field. By applying the voltage difference to the electrochromic layer in the display panel, the electrochromic layer becomes transparent, and at the same time, the charged colored charged particles are allowed to migrate to the side close to the electrochromic layer under the effect of the electric field force, so that the display panel displays the color of the colored charged particles.

For example, the material of the electrochromic layer is an anode allochroic material, and the colored charged particles are positively charged; alternatively, the material of the electrochromic layer is a cathode allochroic material, and the colored charged particles are negatively charged.

If the material of the electrochromic layer is an anode allochroic material, a voltage difference which enables the electrochromic layer to become transparent at this time is negative; in order to make the colored charged particles migrate to the side close to the electrochromic layer when the voltage difference is negative, the colored charged particles at this time are positively charged. If the material of the electrochromic layer is a cathode allochroic material, a voltage difference which enables the electrochromic layer to become transparent at this time is positive; in order to make the colored charged particles migrate to the side close to the electrochromic layer when the voltage difference is positive, the colored charged particles at this time are negatively charged.

For example, the colored charged particles comprise one kind of charged particles.

If the colored charged particles comprise only one kind of charged particles, then colored charged particles in the display panel migrating to a side close to the electrochromic layer under an effect of an electric field force comprises: if the material of the electrochromic layer is an anode allochroic material and the voltage difference is negative, the charged particles migrate to the side close to the electrochromic layer under the effect of the electric field force; alternatively, if the material of the electrochromic layer is a cathode allochroic material and the voltage difference is positive, the charged particles migrate to the side close to the electrochromic layer under the effect of the electric field force.

In a case where the colored charged particles comprise only one kind of charged particles, if the material of the electrochromic layer is an anode allochroic material, the colored charged particles are positively charged. When the applied voltage difference is negative, the electrochromic layer displays multi-colors, the colored charged particles are located on a side of the second substrate, and at this time, the display panel displays the multi-colors of the electrochromic layer. When the applied voltage difference is positive, the electrochromic layer becomes transparent, and at this time, the colored charged particles migrate to the side of the electrochromic layer, and the display panel displays the color of colored charged particles.

In a case where the colored charged particles comprise only one kind of charged particle, if the material of the electrochromic layer is a cathode allochroic material, the colored charged particles are negatively charged. When the applied voltage difference is negative, the electrochromic layer displays multi-colors, the colored charged particles are located on the side of the second substrate, and at this time, the display panel displays multi-colors of the electrochromic layer. When the applied voltage difference is positive, the electrochromic layer becomes transparent, and at this time, the colored charged particles migrate to the side of the electrochromic layer, and the display panel displays to the color of the colored charged particles.

For example, the colored charged particles comprise two kinds of charged particles.

On the premise that the colored charged particles comprise two kinds of charged particles having a same electric quantity but different mobilities, hereinafter, how the first charged particles and the second charged particles migrate is described, when the material of the electrochromic layer is an anode allochroic material or a cathode allochroic material.

(1) The material of the electrochromic layer is an anode allochroic material.

For example, the colored charged particles comprise only the first charged particles and the second charged particles, and the material of the electrochromic layer is an anode allochroic material. Herein, the first charged particles and the second charged particles are both positively charged, an electric quantity of the first charged particles is the same as an electric quantity of the second charged particles, and a mobility of the first charged particles is larger than a mobility of the second charged particles. In this case, the step of colored charged particles in the display panel migrating to a side close to the electrochromic layer under an effect of an electric field force comprises: the first charged particles migrating to the side closer to the electrochromic layer than the second charged particles under the effect of the electric field force, when an absolute value of the voltage difference is between an absolute value of a first preset voltage value and an absolute value of a second preset voltage value; and the second charged particles migrating to the side closer to the electrochromic layer than the first charged particles under the effect of the electric field force, when an absolute value of the voltage difference is equal to or greater than the absolute value of the second preset voltage value. Herein, the absolute value of the first preset voltage value is a minimum voltage absolute value that enables the anode allochroic material to become transparent and can drive the first charged particles to migrate; the absolute value of the second preset voltage value is a minimum voltage absolute value that enables the anode allochroic material to become transparent and can drive the second charged particles to migrate; the first preset voltage value and the second preset voltage value are negative; and the first preset voltage value is larger than the second preset voltage value.

When the material of the electrochromic layer is an anode allochroic material, the colored charged particles need to be positively charged, that is, the first charged particles and the second charged particles are both positively charged, but the electric quantities of both are the same, and at the same time, the mobility of the first charged particles is larger than the mobility of the second charged particles. It is possible to adjust the voltage difference applied according to practical requirements. For example, the absolute value of the voltage difference reaches the minimum voltage absolute value (i.e., the absolute value of the first preset voltage value) that enables the anode allochroic material to become transparent and can drive the first charged particles to migrate, and at the same time, has not reached the minimum voltage absolute value (i.e., the absolute value of the second preset voltage value) that enables the anode allochroic material to become transparent and can drive the second charged particles to migrate, the first charged particles will migrate to the side closer to the electrochromic layer than the second charged particles under the effect of the electric field force; when the absolute value of the voltage difference continues to increase until it reaches the minimum voltage absolute value (i.e., the absolute value of the second preset voltage value) that enables the anode allochroic material to become transparent and can drive the second charged particles to migrate, the second charged particles will migrate to the side closer to the electrochromic layer than the first charged particles under the effect of the electric field force.

Since only when the material of the electrochromic layer is an anode allochroic material, and the voltage difference is negative, the electrochromic layer can become transparent, the first preset voltage value and the second preset voltage value are both negative, and the first preset voltage value needs to be larger than the second preset voltage value. For example, the first preset voltage value is −3V and the second preset voltage value is −5V. When the voltage difference is between −3V and −5V, the first charged particles with higher mobility will migrate to the side close to the electrochromic layer under the effect of the electric field force, to enable the display panel to display the color of the first charged particle; and at this time, if the first charged particles are white, the display panel displays white, and if they are black, the display panel displays black. When the voltage difference is equal to or greater than the absolute value of −5V, the second charged particles with lower mobility will migrate to the side close to the electrochromic layer under the effect of the electric field force, to enable the display panel to display the color of the second charged particles, and at this time, if the second charged particles are white, the display panel displays white, and if they are black, the display panel displays black.

(2) The material of the electrochromic layer is a cathode allochroic material.

For example, the colored charged particles comprise only the first charged particles and the second charged particles, and the material of the electrochromic layer is a cathode allochroic material. Herein, the first charged particles and the second charged particles are both negatively charged, the electric quantity of the first charged particles are the same as the electric quantity of the second charged particles, and the mobility of the first charged particles is larger than the mobility of the second charged particles. In this case, the step of colored charged particles in the display panel migrating to a side close to the electrochromic layer under an effect of an electric field force comprises: the first charged particles migrating to the side closer to the electrochromic layer than the second charged particles under the effect of the electric field force, when the voltage difference is between a third preset voltage value and a fourth preset voltage value; and the second charged particles migrating to the side closer to the electrochromic layer than the first charged particles under the effect of the electric field force, when the voltage difference is equal to or greater than the fourth preset voltage value. Herein, the third preset voltage value is a minimum voltage value that enables the cathode allochroic material to become transparent and can drive the first charged particles to migrate; the fourth preset voltage value is a minimum voltage value that enables the cathode allochroic, material to become transparent and can drive the second charged particles to migrate; the third preset voltage value and the fourth preset voltage value are positive; and the third preset voltage value is smaller than the fourth preset voltage value.

When the material of the electrochromic layer is a cathode allochroic material, the colored charged particles need to be negatively charged, that is, the first charged particles and the second charged particles are both negatively charged, but the electric quantities of both are the same, and the mobility of the first charged particles is larger than the mobility of the second charged particles. It is possible to adjust the voltage difference applied according to practical requirements. For example, when the voltage difference reaches the minimum voltage value (i.e., the third preset voltage value) that enables the cathode allochroic material to become transparent and can drive the first charged particles to migrate, and at the same time, has not reached the minimum voltage value (i.e., the fourth preset voltage value) that enables the cathode allochroic material to become transparent and can drive the second charged particles to migrate, the first charged particles will migrate to the side closer to the electrochromic layer than the second charged particles under the effect of the electric field force; when the voltage difference continues to increase until it reaches the minimum voltage value (i.e., the fourth preset voltage value) that enables the cathode allochroic material to become transparent and can drive the second charged particles to migrate, the second charged particles will migrate to the side closer to the electrochromic layer than the first charged particles under the effect of the electric field force.

Since only when the material of the electrochromic layer is a cathode allochroic material, and the voltage difference is positive, the electrochromic layer can become transparent, the third preset voltage value and the fourth preset voltage value are positive, and the third preset voltage value needs to be smaller than the fourth preset voltage value. For example, the third preset voltage value is 3V and the fourth preset voltage value is 5V. When the voltage difference is between 3V and 5V, the first charged particles with higher mobility will migrate to the side close to the electrochromic layer, under the effect of the electric field force, to enable the display panel to display the color of the first charged particle; and at this time, if the first charged particles are white, the display panel displays white, and if they are black, the display panel displays black. When the voltage difference is equal to or greater than 5V, the second charged particles with lower mobility will migrate to the side close to the electrochromic layer, under the effect of the electric field force, to enable the display panel to display the color of the second charged particles.

Specific colors of the first charged particles and the second charged particles may be selected according to practical requirements. For example, the color of the first charged particles is white, and the color of the second charged particles is black; alternatively, the color of the first charged particles is black, and the color of the second charged particles is white. If the electrochromic layer is transparent and the charged particles on the side close to the electrochromic layer are white, then the display panel displays white; and if they are black, the display panel displays black.

In summary, according to the embodiment of the present disclosure, the electrochromic layer and the electrolyte layer are provided in the display panel, and the colored charged particles are provided in the electrolyte layer. When the electrochromic layer becomes transparent, the display panel can display the color of the colored charged particles, such as pure white or pure black. Thus, the display panel can display not only multi-colors, but also the color of the colored charged particles, which increases diversity of the colors displayed by the display panel.

What is described above is related to the illustrative embodiments of the disclosure only and not limitative to the scope of the disclosure; the scopes of the disclosure are defined by the accompanying claims.

The present application claims priority of Chinese Patent Application No. 201610076591.X filed on Feb. 3, 2016, the disclosure of which is incorporated herein by reference in its entirety as part of the present application.

The invention claimed is:
1. A display panel, comprising: an electrochromic layer and an electrolyte layer arranged in a stacked manner, and at least one kind of colored charged particles being provided in the electrolyte layer,
   wherein, in condition that the electrochromic layer is transparent, the display panel displays color of the colored charged particles.

2. The display panel according to claim 1, further comprising: a plurality of pixel units arranged in a matrix, wherein:
a pixel barrier wall is provided in a gap between pixel units in adjacent columns and adjacent rows; and
the electrochromic layer and the electrolyte layer are located in a chamber enclosed by the pixel barrier wall.

3. The display panel according to claim 2, wherein the colored charged particles comprise only one kind of charged particles.

4. The display panel according to claim 2, wherein: the colored charged particles comprise only first charged particles and second charged particles; an electric quantity of the first charged particles is same as an electric quantity of the second charged particles; and a mobility of the first charged particles is larger than a mobility of the second charged particles.

5. The display panel according to claim 1, wherein:
a material of the electrochromic layer is an anode allochroic material, and the colored charged particles are positively charged; or,
a material of the electrochromic layer is a cathode allochroic material, and the colored charged particles are negatively charged.

6. The display panel according to claim 5, wherein the colored charged particles comprise only one kind of charged particles.

7. The display panel according to claim 5, wherein: the colored charged particles comprise only first charged particles and second charged particles; an electric quantity of the first charged particles is same as an electric quantity of the second charged particles; and a mobility of the first charged particles is larger than a mobility of the second charged particles.

8. The display panel according to claim 1, wherein the colored charged particles comprise only one kind of charged particles.

9. The display panel according to claim 8, wherein the color of the colored charged particles is white or black.

10. The display panel according to claim 1, wherein: the colored charged particles comprise only first charged particles and second charged particles; an electric quantity of the first charged particles is same as an electric quantity of the second charged particles; and a mobility of the first charged particles is larger than a mobility of the second charged particles.

11. The display panel according to claim 10, wherein:
the color of the first charged particles is white, and color of the second charged particles is black; or,
the color of the first charged particles is black, and the color of the second charged particles is white.

12. The display panel according to claim 1, wherein:
with respect to the electrolyte layer, the electrochromic layer is closer to a display side of the display panel.

13. A display device, comprising the display panel according to claim 1.

14. A display method of the display panel according to claim 1, comprising:
applying a voltage difference to the electrochromic layer in the display panel;
the colored charged particles in the display panel migrating to a side close to the electrochromic layer under an effect of an electric field force, while the applied voltage difference makes the electrochromic layer become transparent, so that the display panel displays color of the colored charged particles.

15. The display method according to claim 14, wherein:
a material of the electrochromic layer is an anode allochroic material, and the colored charged particles are positively charged; or,
a material of the electrochromic layer is a cathode allochroic material, and the colored charged particles are negatively charged.

16. The display method according to claim 15, wherein:
the colored charged particles comprise only one kind of charged particles; and
the step of the colored charged particles in the display panel migrating to a side close to the electrochromic layer under an effect of an electric field force comprises:
the charged particles migrating to the side close to the electrochromic layer under the effect of the electric field force, when the voltage difference is negative, if the material of the electrochromic layer is an anode allochroic material; and
the charged particles migrating to the side close to the electrochromic layer under the effect of the electric field force, when the voltage difference is positive, if the material of the electrochromic layer is a cathode allochroic material.

17. The display method according to claim 15, wherein:
the colored charged particles comprise only the first charged particles and the second charged particles; the material of the electrochromic layer is an anode allochroic material; the first charged particles and the second charged particles are both positively charged; an electric quantity of the first charged particles is same as an electric quantity of the second charged particles; and a mobility of the first charged particles is larger than a mobility of the second charged particles;
the step of the colored charged particles in the display panel migrating to a side close to the electrochromic layer under an effect of an electric field force comprises:
the first charged particles migrating to the side closer to the electrochromic layer than the second charged particles under the effect of the electric field force, when an absolute value of the voltage difference is between an absolute value of a first preset voltage value and an absolute value of a second preset voltage value; and,
the second charged particles migrating to the side closer to the electrochromic layer than the first charged particles under the effect of the electric field force, when an absolute value of the voltage difference is equal to or greater than the absolute value of the second preset voltage value; and
the absolute value of the first preset voltage value is a minimum voltage absolute value that enables the anode allochroic material to become transparent and to drive the first charged particles to migrate; the absolute value of the second preset voltage value is a minimum voltage absolute value that enables the anode allochroic material to become transparent and to drive the second charged particles to migrate; the first preset voltage value and the second preset voltage value are negative; and the first preset voltage value is larger than the second preset voltage value.

18. The display method according to claim 15, wherein:
the colored charged particles comprise only the first charged particles and the second charged particles; the material of the electrochromic layer is a cathode allochroic material; the first charged particles and the second charged particles are both negatively charged;

an electric quantity of the first charged particles is the same as an electric quantity of the second charged particles; and a mobility of the first charged particles is larger than a mobility of the second charged particles;

the step of the colored charged particles in the display panel migrating to a side close to the electrochromic layer under an effect of an electric field force comprises:

the first charged particles migrating to the side closer to the electrochromic layer than the second charged particles under the effect of the electric field force, when the voltage difference is between a third preset voltage value and a fourth preset voltage value; and the second charged particles migrating to the side closer to the electrochromic layer than the first charged particles under the effect of the electric field force, when the voltage difference is equal to or greater than the fourth preset voltage value;

the third preset voltage value is a minimum voltage value that enables the cathode allochroic material to become transparent and to drive the first charged particles to migrate; the fourth preset voltage value is a minimum voltage value that enables the cathode allochroic material to become transparent and to drive the second charged particles to migrate; the third preset voltage value and the fourth preset voltage value are positive; and the third preset voltage value is smaller than the fourth preset voltage value.

* * * * *